No. 885,133. PATENTED APR. 21, 1908.
J. C. BARBER.
ROLLER BEARING CENTER PLATE.
APPLICATION FILED APR. 19, 1907.

2 SHEETS—SHEET 1.

Witnesses.
A. H. Opsahl.
Leon B. Losey.

Inventor.
John C. Barber
By his Attorneys,
Williamson & Merchant

No. 885,133. PATENTED APR. 21, 1908.
J. C. BARBER.
ROLLER BEARING CENTER PLATE.
APPLICATION FILED APR. 19, 1907.
2 SHEETS—SHEET 2.
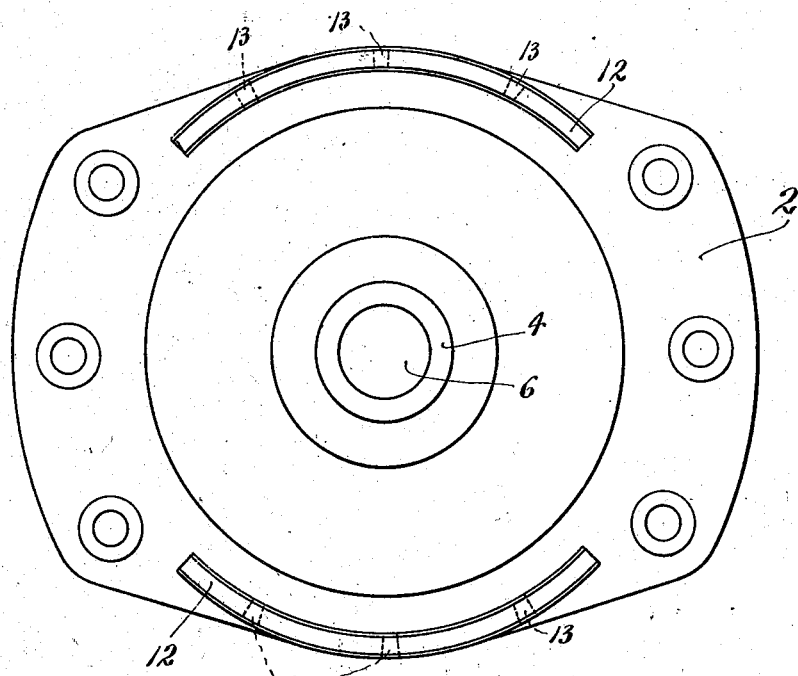
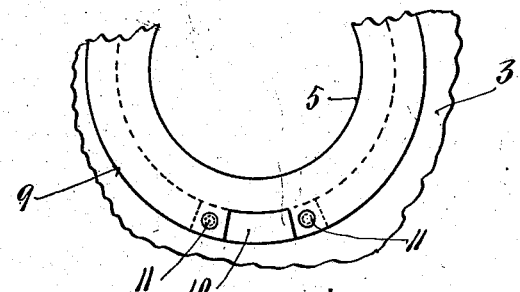
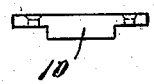
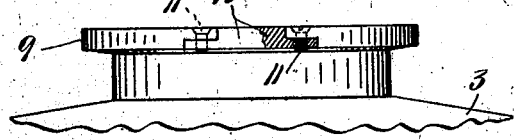
Witnesses
A. H. Opsahl.
Leon B. Losey.
Inventor.
John C. Barber.
By his Attorneys.
Williamson & Merchant

UNITED STATES PATENT OFFICE.

JOHN C. BARBER, OF CHICAGO, ILLINOIS.

ROLLER-BEARING CENTER-PLATE.

No. 885,133.  Specification of Letters Patent.  Patented April 21, 1908.

Application filed April 19, 1907. Serial No. 369,061.

*To all whom it may concern:*

Be it known that I, JOHN C. BARBER, a citizen of the United States, residing at Chicago, in the county of Cook and State of Illinois, have invented certain new and useful Improvements in Roller-Bearing Center-Plates; and I do hereby declare the following to be a full, clear, and exact description of the invention, such as will enable others skilled in the art to which it appertains to make and use the same.

My invention has for its object to provide a simple and efficient form of roller bearing center plate.
To this end, my invention consists of the novel devices and combinations of devices hereinafter described and pointed out in the claims.

The improved center plate herein disclosed was especially designed for use on cars, but it is, of course, capable of general application wherever the corresponding functions are desired.

In the accompanying drawings, which illustrate my invention, like characters indicate like parts throughout the several views.

Figure 1:
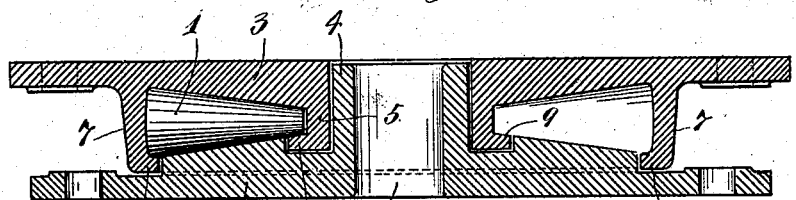
Figure 2:
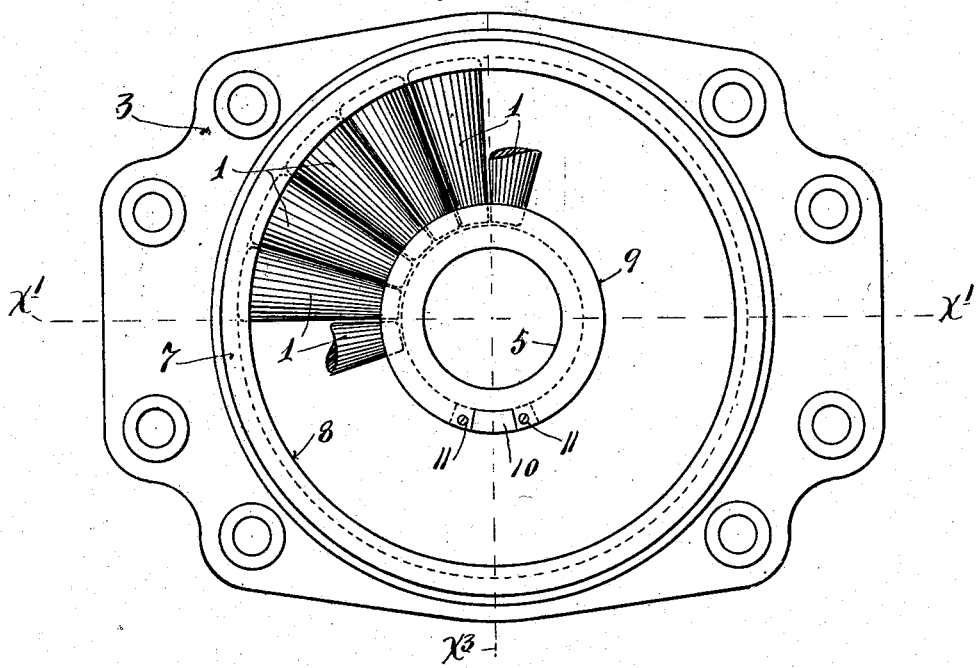
Figure 3:
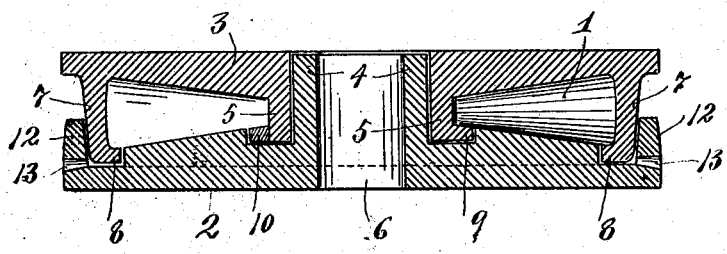

Referring to the drawings; Figure 1 is a vertical longitudinal section through the entire center bearing on the line $x^1\ x^1$ of Fig. 2, with some parts removed. Fig. 2 is a bottom plan view of the upper member of the two bearing plates, with some parts broken away and others removed. Fig. 3 is a cross section through the entire bearing on the line $x^3\ x^3$ of Fig. 2, with some of the rollers removed. Fig. 4 is a plan view of the lower member of the two plates detached. Fig. 5 is a detail showing a portion of the upper plate, illustrated in Fig. 2, in bottom or underneath plan view. Fig. 6 is a detail showing in elevation or edge view the same parts shown in Fig. 5; and Fig. 7 is a detail showing the roller gap closure detached in end elevation.
The numerals 1, 2 and 3 represent, respectively, conical rollers, the lower bearing plate and the upper bearing plate, which parts coöperate to afford the center bearing. The lower plate 2 is adapted to be secured to the truck bolster. The upper plate 3 is adapted to be secured to the body bolster of the car. The lower plate 2 is provided with a hub 4, and the upper plate with a hub 5 which fits over or telescopes with the hub 4 of the lower plate, thus connecting the two plates with freedom for swiveling movement, with respect to each other, when the parts are in working position. The hub 4 of the lower plate 2 is provided with a central passage 6 for the ordinary connecting king pin, not shown. The rollers 1 are truncated cones in radial disposition, between the two plates, and the two plates are of corresponding shape on their roller bearing or tread surfaces to receive between them the said conical rollers 1. The upper plate 3 is provided with a vertical outer flange 7 with inturned lip or lateral flange 8 adapted to underlap or underreach the outer or large ends of the rollers 1, when the latter are pocketed on the upper plate. The hub 5 of the upper plate is provided with a lateral flange 9 adapted to underlap or underreach the inner or small ends of the rollers 1 when in pocketed position on the upper plate.
The flange 9 is provided with a removable bridge section or gap closure 10 which, when removed, enables the rollers 1 to be entered into their pocketed position on the upper plate, one at a time, until they are all in place. The bridge section or gap closure 10 is then secured in its proper place, to close the gap in the flange 9, and, thereafter, all the rollers will be locked in their pocketed position on the upper plate. Otherwise stated, the rollers 1 will thereafter be handled with the upper plate 3. As shown, the closure or bridge section 10, and the seat for the same in the flange 9, are rabbeted to permit the closure to be inserted by endwise radial movement and be fastened to the main flange 9 by counter-sunk set screws or rivets 11, as best shown in Figs. 5, 6 and 7. The lower plate 2 is provided with buffing flanges 12 of segmental form, located at the front and back of the plate, as best shown in Fig. 4. These flanges 12 coöperate with the vertical flange 7 of the upper plate, and the interlocking hubs 4 and 5 of the two plates to take the forward and backward thrusts on the car.

When the parts are in working position, the rollers 1 support the upper plate from the lower plate, with a little clearance below the hub 5 and the vertical flange 7 of the upper plate. The tread or roller bearing surface of the lower plate is raised in respect to the outermost portions of the plate, and terminates outward in an abrupt shoulder, below which the flange 7 of the upper plate extends. Hence, the flange 7 not only serves to take the end thrusts of the rollers 1 and by its part 8 to coöperate with the lateral flange 9 of the hub 5 to pocket and lock the rollers to the upper plate, but serves also as a dust guard to the rollers and the roller bearing surfaces of the two plates. Moreover, in view of the relative positions of the rollers 1 and the tread surface of the lower plate, the dust, sand or other dirt, which may get onto the rollers or the said tread surfaces, will tend to work downward and radially outward, under the action of gravity and the effect of the currents of air, and be thereby removed from the bearing surfaces. To prevent the buffing flanges 12 from catching and retaining any of this sediment, they are provided with waste holes 13, through which the dust will be worked outward by the swiveling motion of the plates or be blown outward by the drafts of air.

The advantage of having the rollers 1 interlocked to the upper plate 3, so that after once being pocketed therein they will be handled with the said upper plate, must be obvious. It avoids loss in the handling, shipment or assembling of the parts, at the place where applied to the cars; and prevents loss of the rollers, when the cars are derailed, or when the trucks and cars are separated, as is often required for making repairs. Moreover, when the car body is jacked up for purposes of repairs, the upper plate and the rollers, of course, go with the car body and there is no opportunity for dirt to be accumulated thereon. On all prior structures, so far as known to me, other than in the structure shown in my own prior application, hereinafter identified, the rollers remain on the plate, thus affording opportunity for the accumulation of sand and dirt between the rollers and on the bearing surface of the lower plate.

With the structure herein disclosed, nothing of this kind can occur. Finally, it should be noted, that the center bearing herein disclosed is simple and cheap to make, and is strong and durable in service. Some of the details can, of course, be varied without departing from the spirit of the invention.

The center plate, herein disclosed and claimed, has some features in common with my pending application, S. N. 321,154, filed June 11th, 1906, but has these features embodied in better mechanical form for efficiency in service and economy in construction.

What I claim is:

A center bearing comprising upper and lower plates having interlocking hubs and outer flanges, and interposed conical rollers supporting the upper from the lower plate with clearance below the outer flange of the upper plate, the outer flange of the lower plate being provided with dust escape passages, one of which plates has lateral flanges formed integral therewith, which flanges lap the ends of the rollers for locking the rollers to the plate with freedom for rotary motion, and one of which lateral flanges is provided with a roller entrance gap and gap closure, all substantially as described.

In testimony whereof I affix my signature in presence of two witnesses.

JOHN C. BARBER.

Witnesses:
L. W. BARBER,
A. M. LOVE.